Dec. 25, 1962  H. J. O. BERKE ET AL  3,069,861
SLUICE DAM SEALING MEANS

Filed Sept. 30, 1958  6 Sheets-Sheet 2

Inventors:
Hans Joachim Otto Berke
and Marijan Ludwig M. Kozelj
By
Patent Agent

Dec. 25, 1962     H. J. O. BERKE ET AL     3,069,861
SLUICE DAM SEALING MEANS

Filed Sept. 30, 1958                6 Sheets-Sheet 3

Inventors:
Hans Joachim Otto Berke
and Marijan Ludwig M. Kozelj
By _____
Patent Agent Inventors
Hans Joachim Otto Berke
and Marijan Ludwig M. Kozelj

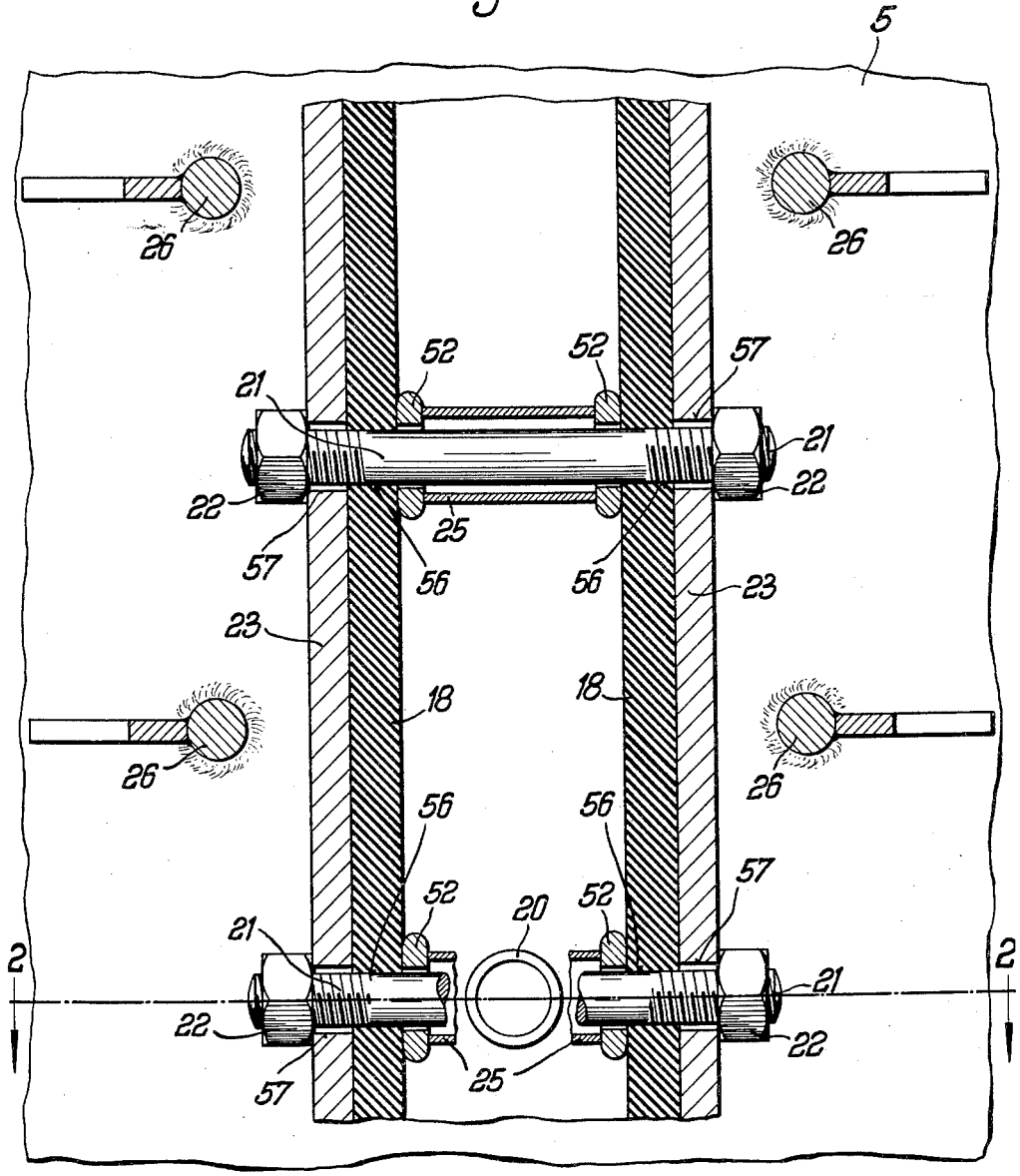

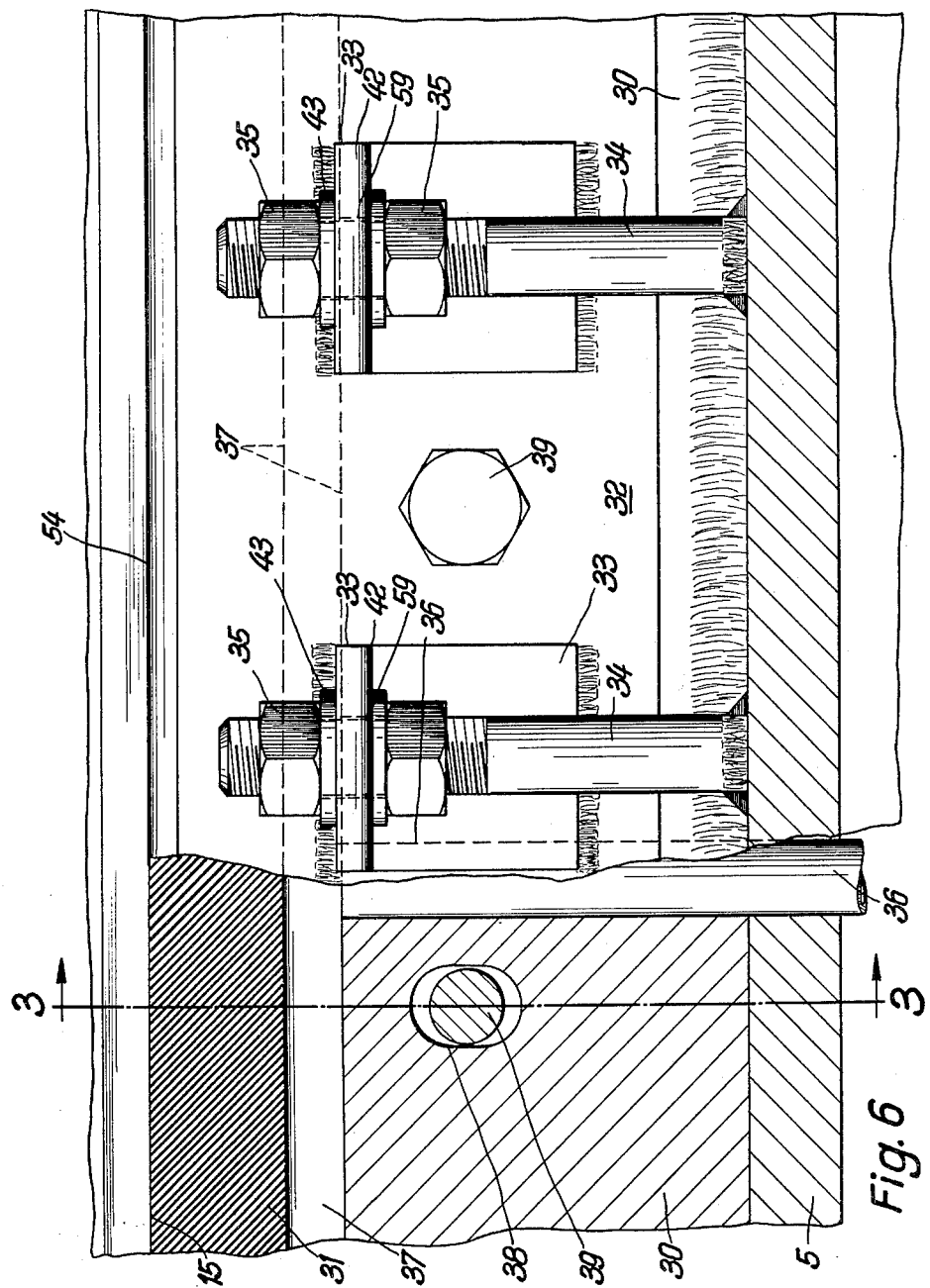

United States Patent Office 3,069,861
Patented Dec. 25, 1962

3,069,861
SLUICE DAM SEALING MEANS
Hans Joachim Otto Berke and Marijan Ludwig M. Kozelj, Rheinhausen, Germany, assignors, by mesne assignments, to Beteiligungs- und Patentverwaltungsgesellschaft mit beschränkter Haftung, Essen, Germany
Filed Sept. 30, 1958, Ser. No. 764,337
Claims priority, application Germany May 8, 1958
7 Claims. (Cl. 61—22)

The present invention relates to resilient sealing means and the mounting thereof for use as packing for dams or weirs, particularly, when erected across deep chutes or sluices, such sealing means including a seal of rubber or other resilient material fixed either to the dam or to the sluiceway within which the dam is arranged, the seal having a bead which is hydraulically pressed against the opposite surface.

It has been known to provide dams, particularly, in deep chutes, with rubber bead seals, which are secured to the body of the dam by means of strips or plates and which seals are subjected to water pressure of the higher water from the inside of the rubber bead.

Since the amount of deformation of the resilient rubber bead is limited, and since a certain deformation is necessary for obtaining sealing contact under pressure, the strips or plates must be spaced by a predetermined distance from the contacting surface of the sluice to be engaged by the seal, which distance has to be closely maintained. This requires that the strips or plates which are to be mounted or welded on the seal supporting member must be machined and fitted thereto to obtain a precise fit. Due to the large dimensions of such members, machining is very difficult and is possible only to a limited extent if the member is assembled at the construction site from several prefabricated structural units.

It is an object of the present invention to provide a deformable sealing means capable of being subjected to water pressure from within, in such a manner, that the seal can be mounted at the site without difficulties and, at the same time, preserve the required spacing from the opposite contact face to the seal and can be readily adjusted in case of wear of the seal or of the opposite contacting member.

It is another object of the present invention to provide the strips or plates mounting the resilient seal with means for adjusting the spacing to the contacting surface.

It is a more specific object of the invention to secure these strips or plates between nuts mounted on studs which, in turn, are attached to the supporting member.

It is another object of the invention to provide the mounting strips or plates with flanges and to provide the supporting member with rib means engaging with the flanges of the mounting strips or plates to form water channels or chambers from which pressure is applied within the rubber bead. The flanges of the mounting strips are suitably provided with openings or slots through which bolts are passed to secure the flanges to the rib means on the dam, said bolts preventing longitudinal shifting of the mounting strips.

It is a still further object of the invention to provide the rubber seal as a hollow, tubular body and to connect its interior to the water pressure so that it will be subjected to inflation from within.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:
FIGURE 1 shows a cross section through a resilient seal mounted on fastening strips or plates having flanges which, together with rib means, are secured to a dam and form water chambers pressurizing the inner walls of the rubber seal, the section of FIGURE 1 being taken along line 1—1 of FIGURE 4;

FIGURE 5 is an elevational view of the seal and fastening means, partly in cross section taken along line 5—5 of FIGURE 2;

FIGURE 6 is an elevational view of the seal and fastening means, partly in cross section taken along line 6—6 of FIGURE 3.

Figure 1:
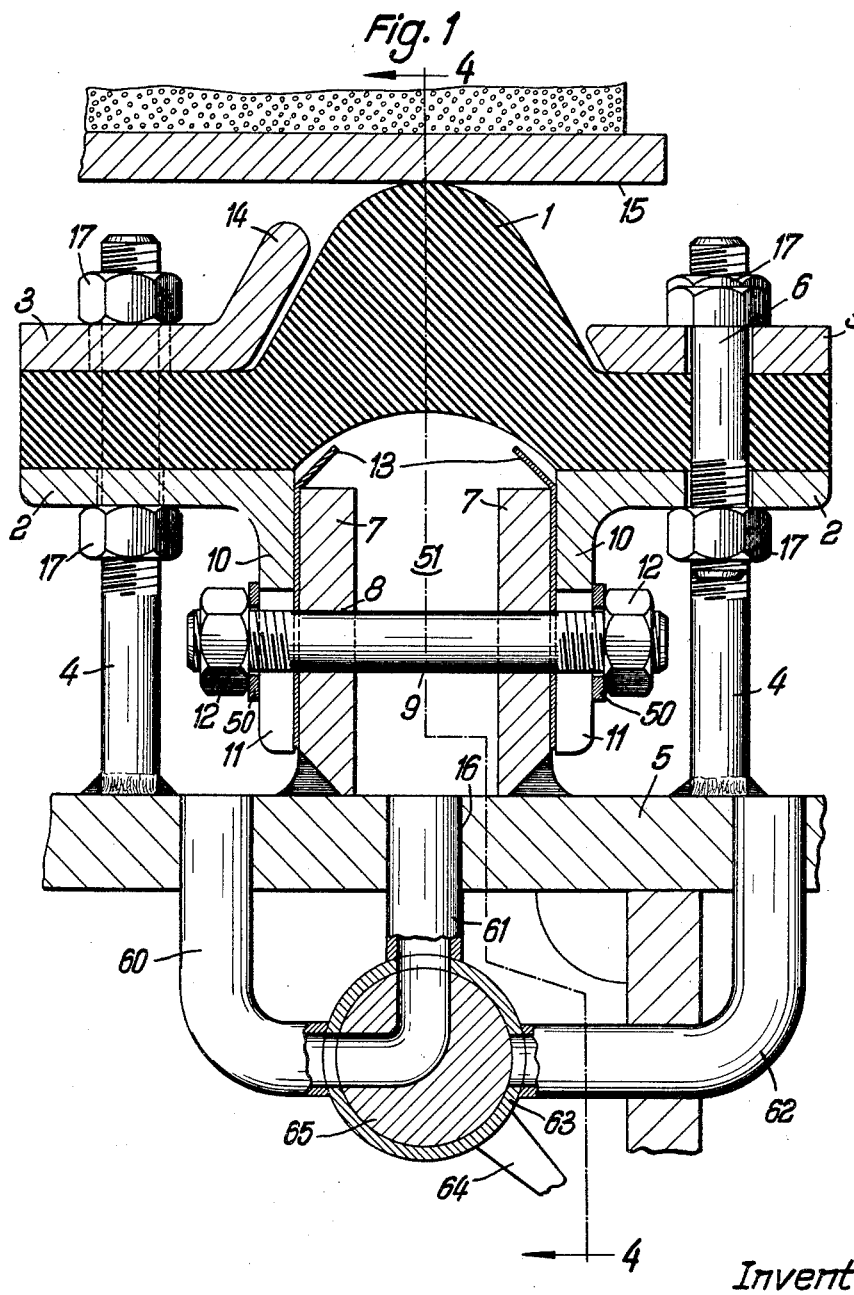
Figure 4:
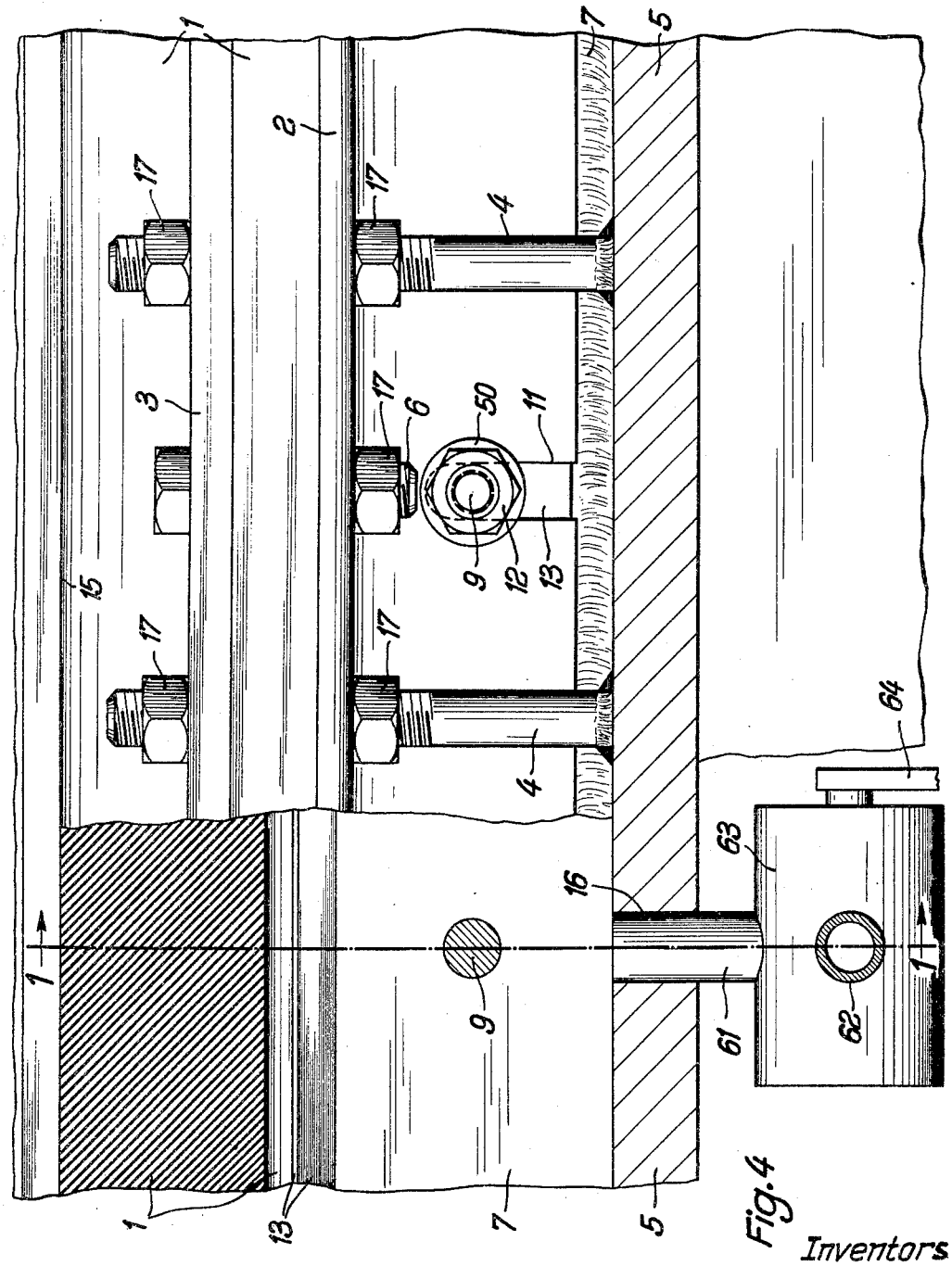
FIGURE 4 is an elevational view of the seal and fastening means, partly in cross section taken along line 4—4 of FIGURE 1.

Referring in more detail to the drawings, and particularly to FIGURES 1 and 4, which show one possible embodiment wherein the resilient seal is secured to an edge plate 5 of the dam or gate instead of to the contact surface 15 of the sluiceway which is closed off by the dam. In this embodiment, a rubber seal member 1 is supported on two mounting strips 2 by means of compression plates 3, which are secured to these mounting strips 2 by bolt and nut means 6 and 17, furnishing the clamping pressure.

Mounting studs 4 are welded to the edge plate 5 of the dam, forming two rows thereon. These studs 4 as shown in FIGURE 1 are positioned in a plane below the plane of the drawing. On the right side of FIGURE 1, the bolt 6 appears in front of the stud 4, on which mounting strips 2 are supported, these securing means being staggered, as shown in FIGURE 4. A pair of spaced ribs 7 is welded to the edge plate 5 between the studs 4, said ribs 7 being provided with aligned holes 8 adapted to receive bolts 9. The mounting strips 2 have flanges 10 disposed parallel with said ribs 7. These flanges 10 have aligned elongated slots 11 which, in turn, are aligned with the openings 8 in the ribs 7, so that the bolts 9 can also pass through these aligned slots 11. Nuts 12 are mounted on threaded ends of the bolts 9 adapted to secure the pair of flanges 10 to the pair of ribs 7, whereby washers 50, inserted between the nuts 12 and the flanges 10, transmit the pressure exerted by the bolt-nut assembly. A gasket 13 of deformable or plastic sealing material is inserted between each pair of opposed surfaces of the ribs 7 and the flanges 10 to seal a water chamber 51 between the spaced ribs 7. The compression plate 3 on the left side, which is assumed to be the lower-water side, has a long projection 14 directed against the slanting outer face of the bead 1, so as to support the latter when the bead is sealed to the opposite contacting surface 15 of the sluiceway. An opening 16 in the edge plate 5 admits the water to the mentioned chamber 51 between the ribs 7, said chamber being defined by the inner walls of the ribs 7, the inner arched wall of the bead 1 and the outer wall of the edge plate 5.

A three-way valve 63 is provided with a plug 65 adapted to selectively connect the water chamber 51 via a tube 61 inserted in the opening 16 either with the higher water via a conduit 62 or with the lower water via a conduit 60. The plug 65 can be turned by means of a lever 64. Other types of valves may be employed in place of the plug valve 63, for example, gate valves.

The operation of the device is as follows: In order to move the dam to which plate 5 is attached and is moving therewith, from a position wherein the seal is effective to a non-sealing position or a different sealing position, the water chamber 51 is brought into communication with the lower water via the tube 61, valve 63 and conduit 60, whereby the hydrostatic pressure in the chamber 51 is reduced to such a degree that the rubber seal 1 is pressed towards the opposite contacting surface 15 of the sluiceway only by the action of its own resiliency, opposing the pressure of the higher water. When the dam body has obtained its final proper position, the water chamber 51, by rotating the valve 63, communicates with the higher water via the tube 61, valve 63 and conduit 62 with the result, that the rubber bead 1 is expanded against the opposite contacting surface 15.

If the rubber bead 1 is worn, or if the distance between the edge plate 5 of the dam and the sluiceway surface 15 has changed or been altered, the sets of nuts 17 on the mounting studs 4 and the bolts 6 are loosened, so that the respective mounting strips 2, together with the clamping members 3 and the edges of the rubber seal, can be adjusted to the desired and proper position. During this adjustment, the nuts 12 on the bolts 9 have to be likewise loosened, said bolts being retained in the holes 8 but being permitted to slide in the slots 11 during the adjusting step.

Figure 2:
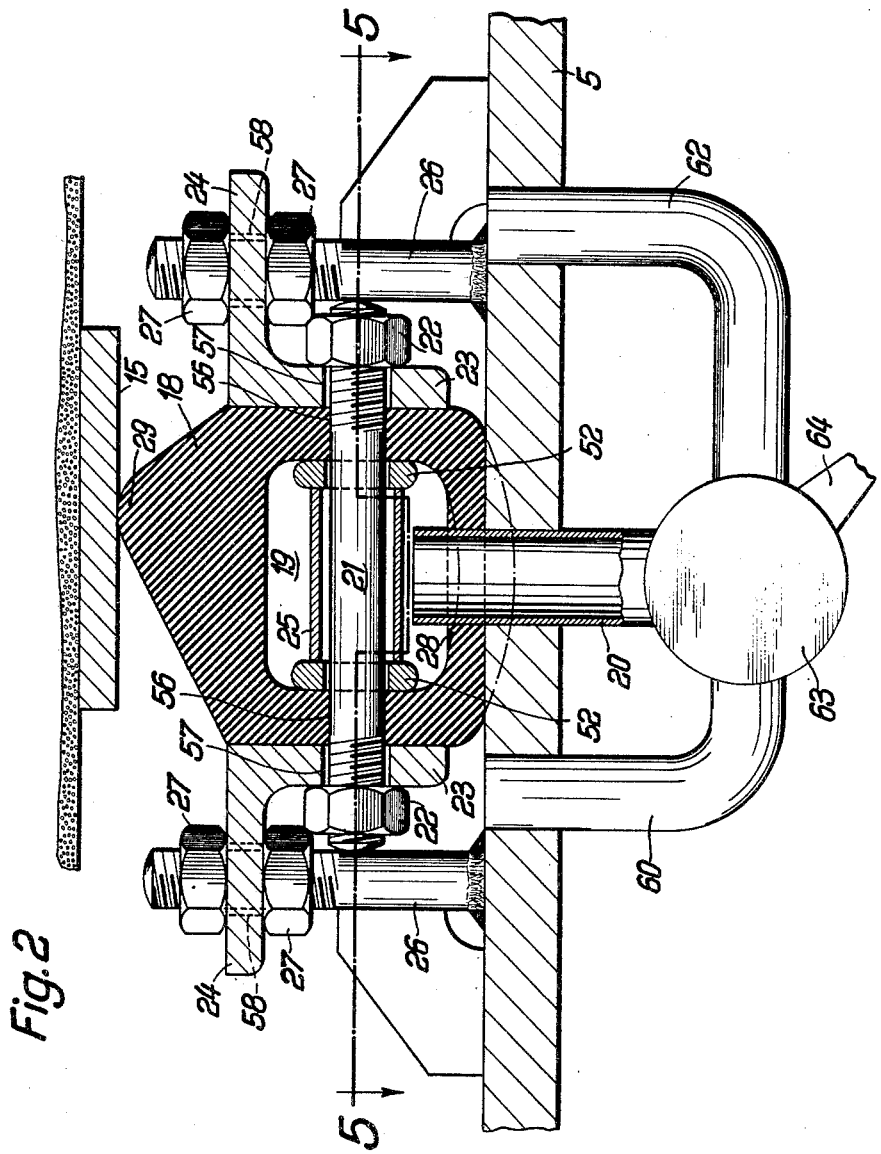
FIGURE 2 shows in a cross sectional view through a resilient seal another embodiment of the invention wherein the seal is mounted as a tubular body between two fastening strips, the section of FIGURE 2 being taken along line 2—2 of FIGURE 5.

In the embodiment of FIGURES 2 and 5, a rubber seal body 18 forms a tubular hollow member, the interior 19 of which can be subjected to pressure selectively from the higher water or lower water via a connecting conduit 20 passed through an opening in the edge wall of the seal body 18 and controlled by the valve 63 connected with the conduits 60 and 62 in the same way as in the embodiment of FIGURES 1 and 4. Bolts 21 are passed through holes 56 in the sides of the seal body 18. Nuts 22 are mounted on the ends of the bolts 21. Flanges 23 of mounting strips 24 are applied to both sides of the seal body 18. At the locations where the bolts 21 are passed through the seal body 18, these flanges 23 have holes 57, through which the ends of the bolts 21 extend. Spacer sleeves 25 with annular protective members 52 at their ends are provided around the bolts 21 in the interior chamber 19 of the seal body 18. Thus, pressure sealing is obtained at the holes 56 in the seal body 18, through which the bolts 21 are passed when the nuts 22 are tightened to mount the seal body 18 between and to the flanges 23. These flanges 23 form integral parts of the strips 24 disposed at right angles with the flanges 23. These mounting strips 24 have openings 58 through which the upper ends of the studs 26 extend, the latter being welded to the edge plate 5 of the dam. The mounting strips 24 are secured to the studs 26 by means of pairs of nuts 27 on these studs, between which pairs the strips 24 are adjustably retained. The position of the rubber seal 18 with respect to the edge plate 5 of the dam can be altered by adjusting the pairs of nuts 27 on the respective studs 26. During such adjusting operation, the nuts 22 on the bolts 21 do not have to be loosened. In the position illustrated in FIGURE 2, the rear wall 28 of the rubber seal body 18 is pressed against the edge plate 5, said rear wall 28 assuming the position shown in FIGURE 2 by dot-dash lines, when in relaxed condition. A tight seal with the edge plate 5 is obtained, due to this deformation of the rear wall 28.

An arched bead 29 of the rubber seal body 18 is adapted to contact the opposite sluiceway surface 15, said bead being offset with respect to the center of the seal body 18 in such a way, that the water pressure of the higher water, assumed to be acting from the right side in FIGURE 2, will be taken up by the rubber seal body 18 in a superior manner, due to the unsymmetrical shape of the bead 29.

Figure 3:
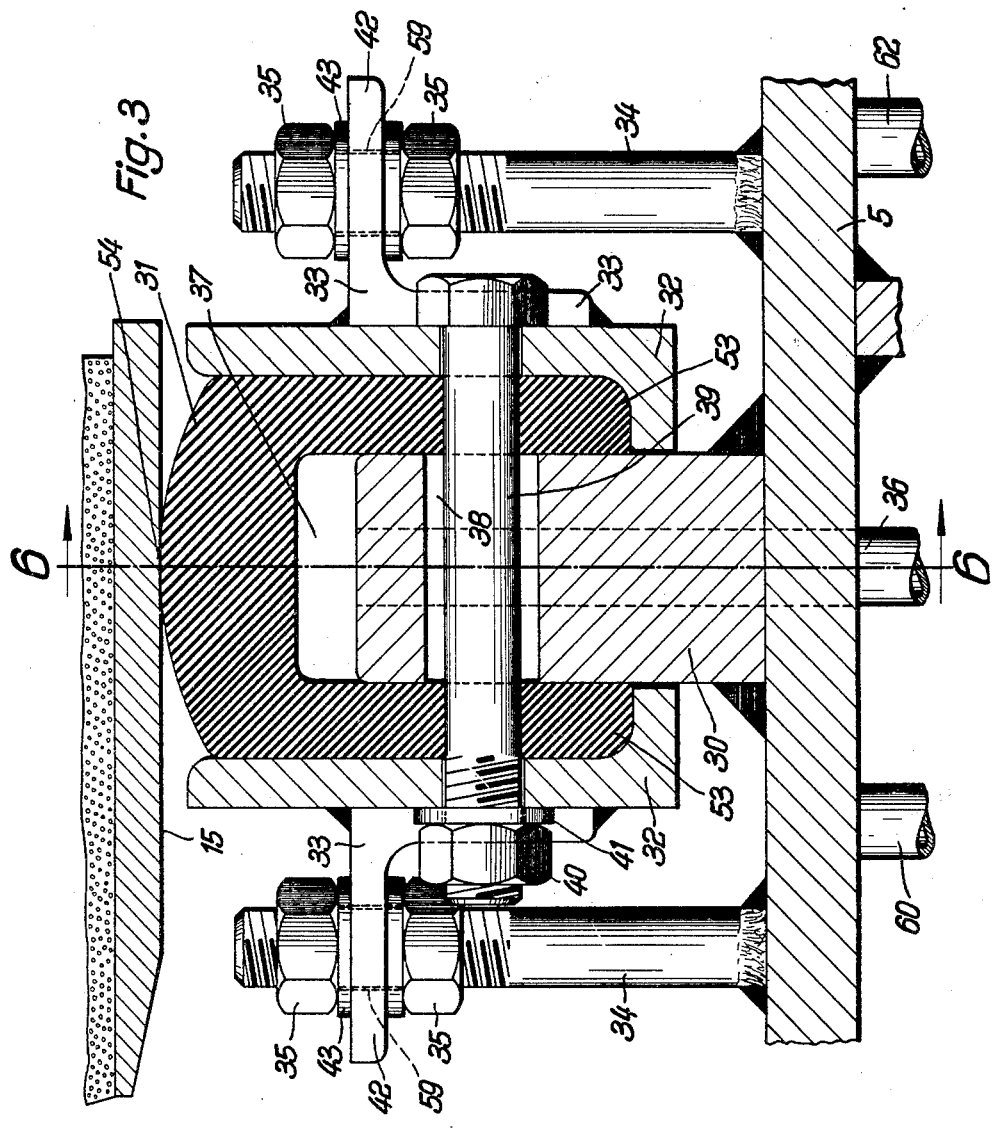
FIGURE 3 illustrates in a cross sectional view through a U-shaped resilient seal another embodiment of the invention wherein the seal is attached to a main rib and held between two clamping strips to form with these strips an adjustable seal, this section being taken along line 3—3 of FIGURE 6.

In the embodiment of FIGURES 3 and 6, a U-shaped resilient or rubber seal 31 straddles a rib 30 and is pressed thereon by means of bolts 39 having nuts 40. Clamping strips 32 are applied to both sides of the rubber seal 31 and the bolts 39 are passed through aligned holes in these clamping strips 32, in side walls 53 of the rubber body 31 and in the rib 30, whereby, when the nuts 40 are tightened, these side walls 53 are compressed between the strips 32 and the rib 30. Brackets 33, having outwardly extending lugs 42, are welded to the strips 32. These lugs 42 have holes 59 through which the ends of the studs 34 extend, the latter being welded to the edge plate 5 of the dam. The lugs 42 are secured to the studs 34 by means of pairs of nuts 35 and inserted washers 43. Water pressure can be applied to an inner chamber 37 in the U-shaped seal via a tube 36, passing through the rib 30 and the edge plate 5. Oblong openings 38 are provided across the rib 30 through which the bolts 39 are passed. The rubber seal body 31 is arched at its front face where it is adapted to contact the opposite surface 15 of the sluiceway.

If the bead 54 of the rubber seal body 31 is to be displaced with respect to the opposite surface 15, the chamber 37 is relieved of the water pressure via the tube 36. Then, the nuts 40 are loosened on the bolts 39, so that these bolts can be adjusted in the oblong openings 38 of the rib 30, whereby, simultaneously, the strips 32 and the rubber seal 31 may be displaced. Thereafter, the nuts 35 on the studs 34 are loosened and adjusted to such position that the lugs 42 of the brackets 33, respectively inserted between two pairs of nuts 35, are brought to the desired position together with the clamping strips 32. The nuts 40 on the bolts 39 are now tightened, whereby the clamping strips 32 via washer 41 are compressed and the inserted walls 53 of the rubber seal body 31 are pressed against the rib 30. Finally, the positions of the lugs 42 are fixed by tightening the pairs of nuts 35 on the studs 34. In order to increase the contact pressure of the rubber bead 54, acting on the surface 15, the water chamber 37 is subjected to water pressure via the tube 36.

Alternatively, the resilient seals may be fixed to the walls of the sluiceway and be distended toward the edge surface of the dam by water pressure, this embodiment not being illustrated in the drawings.

We claim:

1. A sealing means to be interposed between a first surface and a second surface, one of which surfaces is associated with a sluiceway and the other of which surfaces is associated with a dam for closing the sluiceway, said sealing means comprising a resilient elongated sealing body having a bead along its outer surface for contacting said first surface; mounting strip means disposed along said body adjacent each side of said bead; stud means fixed to said second surface and extending toward said first surface, said stud means extending beyond the strip means; retaining means on said stud means and securing said strip means thereto, said retaining means being adjustable on said stud means to determine the spacing between the bead and said first surface; an enclosed water chamber between said second surface and the resilient body and including as one wall thereof the portion of the resilient body located behind said bead; and valve means for selectively placing said water chamber in communication with different fluid pressures, said bead being elastically displaceable toward said first surface by the fluid pressure in said water chamber.

2. In a sealing means as set forth in claim 1, said studs passing through holes in the strip means; and said retaining means comprising nuts on each side of the strip means and jammed thereagainst to position them longitudinally of the studs.

3. A sealing means to be interposed between a first surface and a second surface, one of which surfaces is associated with a sluiceway and the other of which surfaces is associated with a dam for closing the sluiceway, said sealing means comprising a resilient elongated sealing body having a bead along its outer surface for contacting said first surface; two ribs extending in the direction of the seal and fixed to said second surface in spaced relation to form therewith a channel; mounting strip means disposed along said body adjacent each side of said bead, said strip means including two parallel mounting strips extending away from said bead, said mounting strips being provided with flanges, each of said flanges engaging one of said ribs, the resilient body closing the outer extremity of the channel to form an enclosed water chamber; stud means fixed to said second surface and extending toward said first surface, said stud means extending beyond the strip means; retaining means on said stud means and securing said strip means thereto, said retaining means being adjustable on said stud means to determine the spacing between the bead and said first surface; and valve means for selectively placing said water chamber in communication with different fluid pressures, said bead being elastically displaceable toward said first surface by the fluid pressure in said water chamber.

4. A sealing means to be interposed between a first surface and a second surface, one of which surfaces is associated with a sluiceway and the other of which surfaces is associated with a dam for closing the sluiceway, said sealing means comprising a resilient elongated sealing body having a bead along its outer surface for contacting said first surface, said resilient body comprising a tubular structure forming an enclosed water chamber and having said bead along its outer wall, the inner wall of the body lying on said second surface and pressing thereagainst when the water chamber is pressurized; mounting strip means disposed along said body adjacent each side of said bead; stud means fixed to said second surface and extending toward said first surface, said stud means extending beyond the strip means; retaining means on said stud means and securing said strip means thereto, said retaining means being adjustable on said stud means to determine the spacing between the bead and said first surface; and valve means for selectively placing said water chamber in communication with different fluid pressures, said bead being elastically displaceable toward said first surface by the fluid pressure in said water chamber.

5. A sealing means to be interposed between a first surface and a second surface, said second surface being associated with a dam and a sluicegate, comprising a rib extending in the direction of the seal and fixed to said second surface; a resilient elongated sealing body having a bead along its outer surface for contacting said first surface, said resilient body being U-shaped on the side thereof opposite said bead and fitting partway over said rib to form therewith an enclosed water chamber; mounting strip means disposed along said body adjacent each side of said bead; clamping strip means connected to said mounting strip means and located on opposite sides of the U-shaped sealing body for maintaining the seal in tight contact with the rib; stud means fixed to said second surface and extending toward said first surface, said stud means extending beyond the strip means; retaining means on said stud means and securing said strip means thereto, said retaining means being adjustable on said stud means to determine the spacing between the bead and said first surface; and valve means for selectively placing said water chamber in communication with different fluid pressures, said bead being elastically displaceable toward said first surface by the fluid pressure in said water chamber.

6. In a sealing means as set forth in claim 3, said ribs and flanges being respectively provided with sets of holes aligned therethrough, and bolts through the holes for securing the flanges to the ribs in sealed engagement, at least one of said sets at the engagement of each flange and rib being slotted to permit adjustment of the mounting strip means on said stud means.

7. A sealing means to be interposed between a first surface associated with a dam and a second surface associated with a sluiceway which the dam may close, said sealing means comprising, a rib on said first surface, a U-shaped resilient body inversely positioned on said rib leaving a chamber between the bottom of the U and the top of said rib, at least one transverse elongated slot in said rib, two clamping strips having L-shaped cross-section embracing partially the side walls of said U-shaped resilient body, each of said clamping strips having at least one transverse hole; a pressure conduit passing through said rib terminating at said chamber, studs mounted on said first surface, lugs extending outwardly from said clamping strips and adjustably secured to said studs, a bolt passing through said transverse slot and holes and securing said clamping strips to said resilient body thereby pressing the side walls of the latter against said rib at both sides thereof, and a bead integral with said resilient body and selectively resting against said second surface dependent upon the pressure in said chamber.

References Cited in the file of this patent

UNITED STATES PATENTS

| 1,707,039 | Becher | Mar. 26, 1929 |
| 1,941,183 | Nordin | Dec. 26, 1933 |
| 2,045,824 | Becher | June 30, 1936 |
| 2,097,352 | Starr | Oct. 26, 1937 |
| 2,683,354 | Harza | July 13, 1954 |

FOREIGN PATENTS

| 159,232 | Austria | 1940 |
| 1,082,128 | France | 1954 |
| 1,108,128 | France | 1955 |
| M 23,229 | Germany | Mar. 15, 1956 |
| 1,026,696 | Germany | Mar. 20, 1958 |